(12) United States Patent
Kim

(10) Patent No.: US 9,573,631 B2
(45) Date of Patent: Feb. 21, 2017

(54) LOCKING APPARATUS OF SIDE-GATE

(71) Applicant: Hyundai Motor Company, Seoul (KR)

(72) Inventor: Sang-Yeop Kim, Bongdong-eup (KR)

(73) Assignee: Hyundai Motor Company, Seoul (KR)

( * ) Notice: Subject to any disclaimer, the term of this patent is extended or adjusted under 35 U.S.C. 154(b) by 50 days.

(21) Appl. No.: 14/565,171

(22) Filed: Dec. 9, 2014

(65) Prior Publication Data

US 2016/0032632 A1 Feb. 4, 2016

(30) Foreign Application Priority Data

Jul. 30, 2014 (KR) .......................... 10-2014-97289

(51) Int. Cl.
*E05C 3/06* (2006.01)
*B62D 33/037* (2006.01)
*E05B 53/00* (2006.01)
*B60J 5/04* (2006.01)

(52) U.S. Cl.
CPC ............ *B62D 33/037* (2013.01); *E05B 53/00* (2013.01); *E05C 3/06* (2013.01); *B60J 5/0498* (2013.01)

(58) Field of Classification Search
CPC ......... Y10T 292/0843; Y10T 292/1018; Y10T 292/0823; Y10T 292/0966; Y10T 292/0993; Y10T 292/1079; Y10T 74/2048; Y10T 74/20492; E05B 81/34

USPC ..... 292/196, 22, 39, 51, 112, 160, 172, 142, 292/199, 279

See application file for complete search history.

(56) References Cited

U.S. PATENT DOCUMENTS 2,001,403 A * 5/1935 Williams ................ E05B 83/02
292/22
2,955,862 A * 10/1960 Claud-Mantle ........... E05C 5/00
292/142

FOREIGN PATENT DOCUMENTS

| JP | 08-026146 A | 1/1996 |
|---|---|---|
| JP | 2805247 B2 | 7/1998 |
| KR | 20-1997-0001584 U | 1/1997 |

* cited by examiner

*Primary Examiner* — Mark Williams
(74) *Attorney, Agent, or Firm* — Morgan, Lewis & Bockius LLP

(57) ABSTRACT

A locking apparatus of a side-gate in which a locker pivotably mounted to a post binds a hook when the side-gate mounted with the hook pivots to be raised, may include a knob that is located to be spaced apart from the locker and is pivotably mounted to the post, and a link bar, one end of which is connected to the locker, and another end of which is connected to the knob, wherein rotational force generated by the knob is transmitted to pivot the locker through a link bar.

5 Claims, 6 Drawing Sheets

LOCKING APPARATUS OF SIDE-GATE

CROSS-REFERENCE TO RELATED APPLICATIONS

The present application claims priority to Korean Patent Application No. 10-2014-97289, filed on Jul. 30, 2014, the entire contents of which is incorporated herein for all purposes by this reference.

BACKGROUND OF THE INVENTION

1. Field of the Invention

The present invention relates to a locking apparatus of a heavy-duty truck side-gate, and more particularly, to a locking apparatus of a side-gate configured to be configured to operate a locker at the bottom of the post so that opening of the side-gate is easily allowed (rotation of the side-gate to a lower part of a floor can be easily allowed).

2. Description of Related Art

Trucks with various types and sizes have been produced, depending on the type and weight of cargo.

Of these, in a case of a truck provided with a loading space having no roof, a floor (see reference numeral 7 in FIG. 2) capable of loading the cargo behind a driver's seat is provided, and a side-gate 1 is rotatably attached to both sides and rear edges of the floor on the floor (as illustrated in FIG. 1B) to prevent the cargo from falling out.

The side-gate is installed on a side of the floor one by one depending on the size of the truck, but in the case of a heavy truck, since it is difficult to manually open and close the side-gate 1 due to increased size and weight of the side-gate 1, as illustrated in FIG. 1A, two or more side-gates 1 are produced in a structure that is arranged side by side along the length of the vehicle body.

In the case of a truck in which two or more side-gates are installed on one side of the floor, as illustrated in FIG. 1A, posts 4 vertically raised and fixed to the floor are installed between the adjacent side-gates 1, and lockers 5 mounted to be rotatable on the post 4 are configured to fix hooks 2 (installed on the side-gate).

The hook 2 is installed at a position that can come into contact with the post 4 at the top of the outer surface of the side-gate 1, and has a shape formed with grooves 3 to allow entry of the locker 5.

The locker 5 projects from the outer surface of the post 4 and pivots. When the side-gate 1 is closed in a state of pivoting upward (a dotted line state in FIG. 1A) and the hook 2 is located below a rotary axis of the locker 5, the locker 5 pivots downward to restrict the hook 2 (a solid line state in FIG. 1A), thereby preventing pivoting of the side-gate 1.

Meanwhile, since a heavy truck carries a large amount of load, a leaf spring with an increased thickness (or with an increased number of lamination) to bear a large load is used. Thus, a vehicle posture (c) as a height from a ground to the top of a chassis frame 6 c becomes higher than a light truck.

Since a height (b) of the side-gate also increases with the increase of cargo on board, a height (a) of a deck lock as a height from the ground to the rotary axis of the locker 3 also increases.

That is, there has been a problem in which the length of the truck and the load capacity increase, the vehicle posture (c) and the height of the side-gate 1 increase, and thus the height of the deck lock becomes higher to a level that may cause inconvenience of a worker, and thus, there has been a need to solve such a problem.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a locking apparatus of a side-gate which can release the locked state by easily pivoting the locker even in a case of a short person.

An aspect of the present invention provides a locking apparatus of a side-gate in which a locker pivotably mounted to a post binds a hook when a side-gate mounted with the hook pivots to be raised, the apparatus including a knob that is located to be spaced apart from the locker and is pivotably mounted to the post, and a link bar, one end of which is connected to the locker, and another end of which is connected to the knob, wherein rotational force generated by the knob is transmitted to pivot the locker through a link bar.

The post may be disposed to be raised to be aligned with the side-gate when the side-gate is raised, on one side of the post, the locker may be located on a relatively upper side, and the knob may be located on a relatively lower side.

Connection between the knob and the link bar, and connection between the locker and the link bar may be performed through a bevel gear, and a gear ratio between the knob and the link bar may be set to be different from a gear ratio between the locker and the link bar.

The post may be disposed between the two adjacent side-gates, and to allow each of both side-gates to be fixed, by forming a set of the locker, the knob, and the link bar, two sets may be mounted on both sides one by one.

According to an aspect of the present invention having the above-described configuration, since the locker can rotate through the knob, there is an effect of being configured to easily unlock the lock of the side-gate even by a short person, by disposing the knob at the bottom of the post.

The connection between the locker and the link bar, and the connection between the knob and the link bar are performed through a bevel gear, but there is an effect of being configured to pivot the locker with only a relatively small force through the adjustment of the gear ratio.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1A:
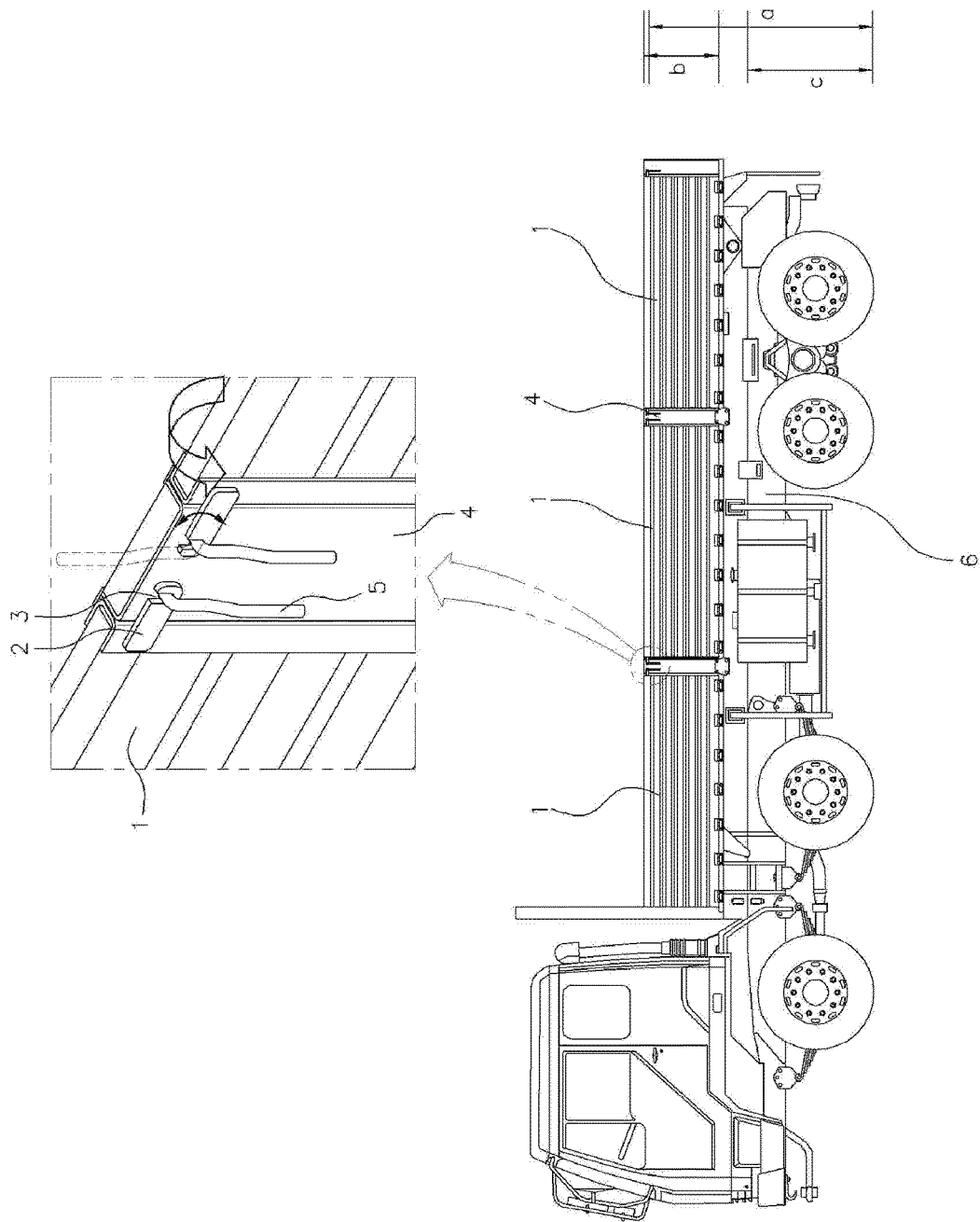
FIG. 1A is a view illustrating a side aspect of a heavy truck and an aspect in which a conventional locking apparatus of a side-gate is attached.
Figure 1B:
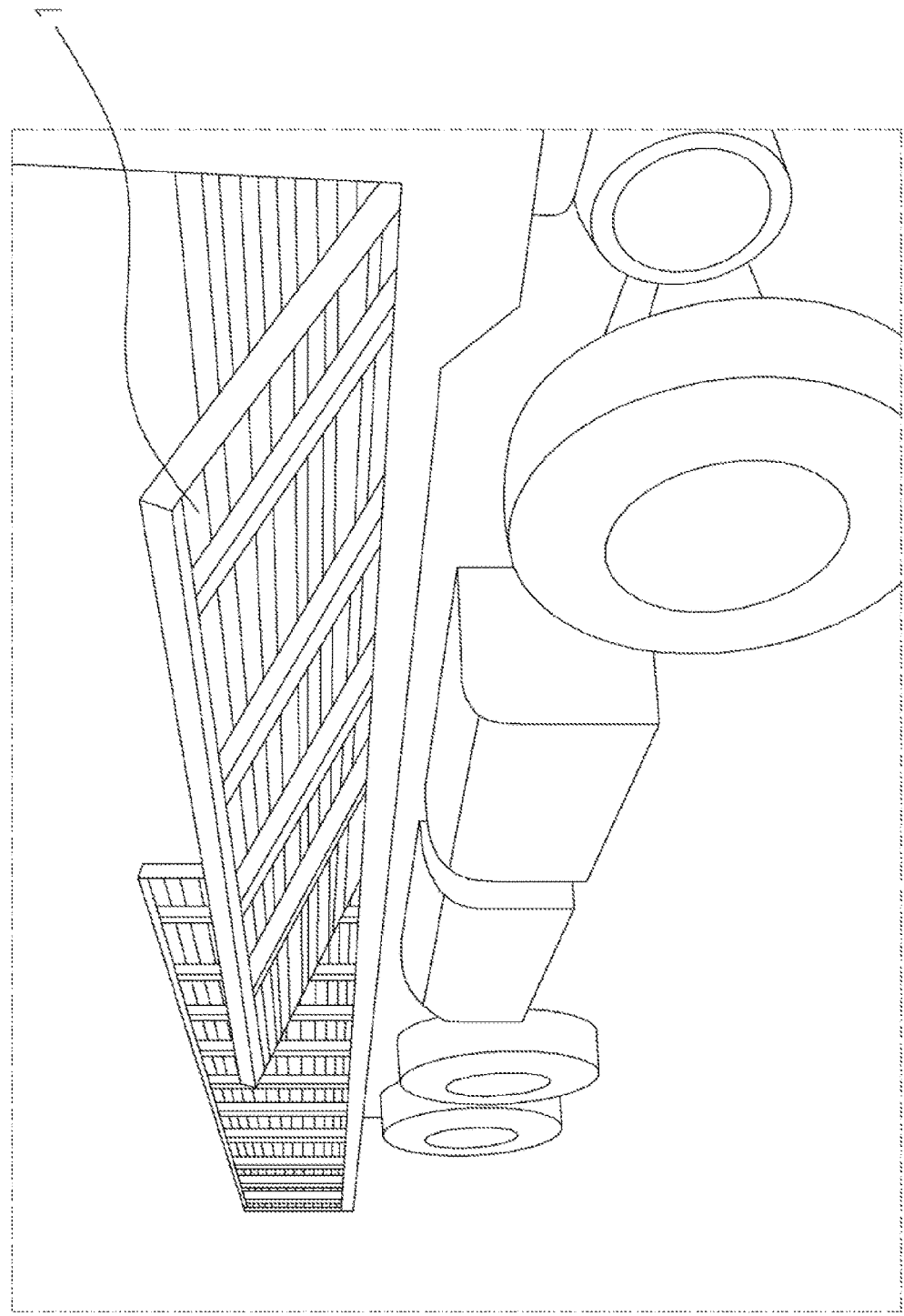
FIG. 1B is a photograph of an aspect in which the side-gate is pivoted down and is opened.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, a locking apparatus of a side-gate according to an exemplary embodiment of the present invention will be described in more detail with reference to the drawings.

Figure 2:
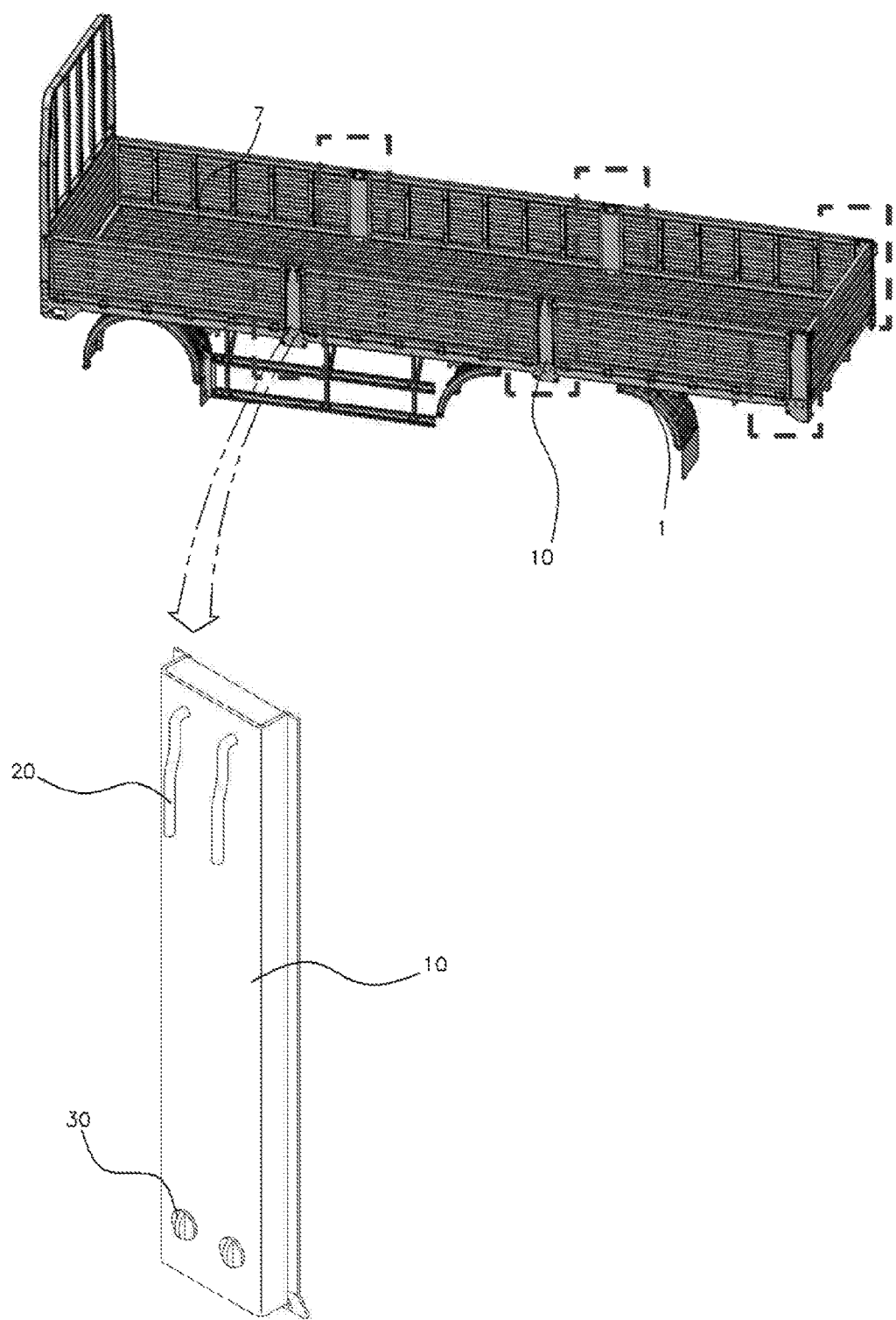
FIG. 2 is a diagram illustrating a locking apparatus of side-gates according to an exemplary embodiment of the present invention.

As illustrated in FIG. 2, the locking apparatus of the side-gate of the present invention has a structure in which a locker 20 is pivotably coupled to a post 10, and the locker 20 can also pivot through a knob 30 disposed to be spaced apart from the locker 20, and the post 10 is mounted to be located between the adjacent side gates 1 mounted on both edges of a floor 7. When the side gate 1 having a hook pivots to be vertically raised (closed) as in the conventional structure, the locker 20 can pivot to bind or release the hook.

The post 10 is disposed to be raised to be aligned with the side-gate 1 when the side-gate 1 is raised, and on the outer surface the post 10, the locker 20 is located on a relatively upper side, and the knob 30 is located on a relatively lower side at a predetermined distance.

Figure 3:
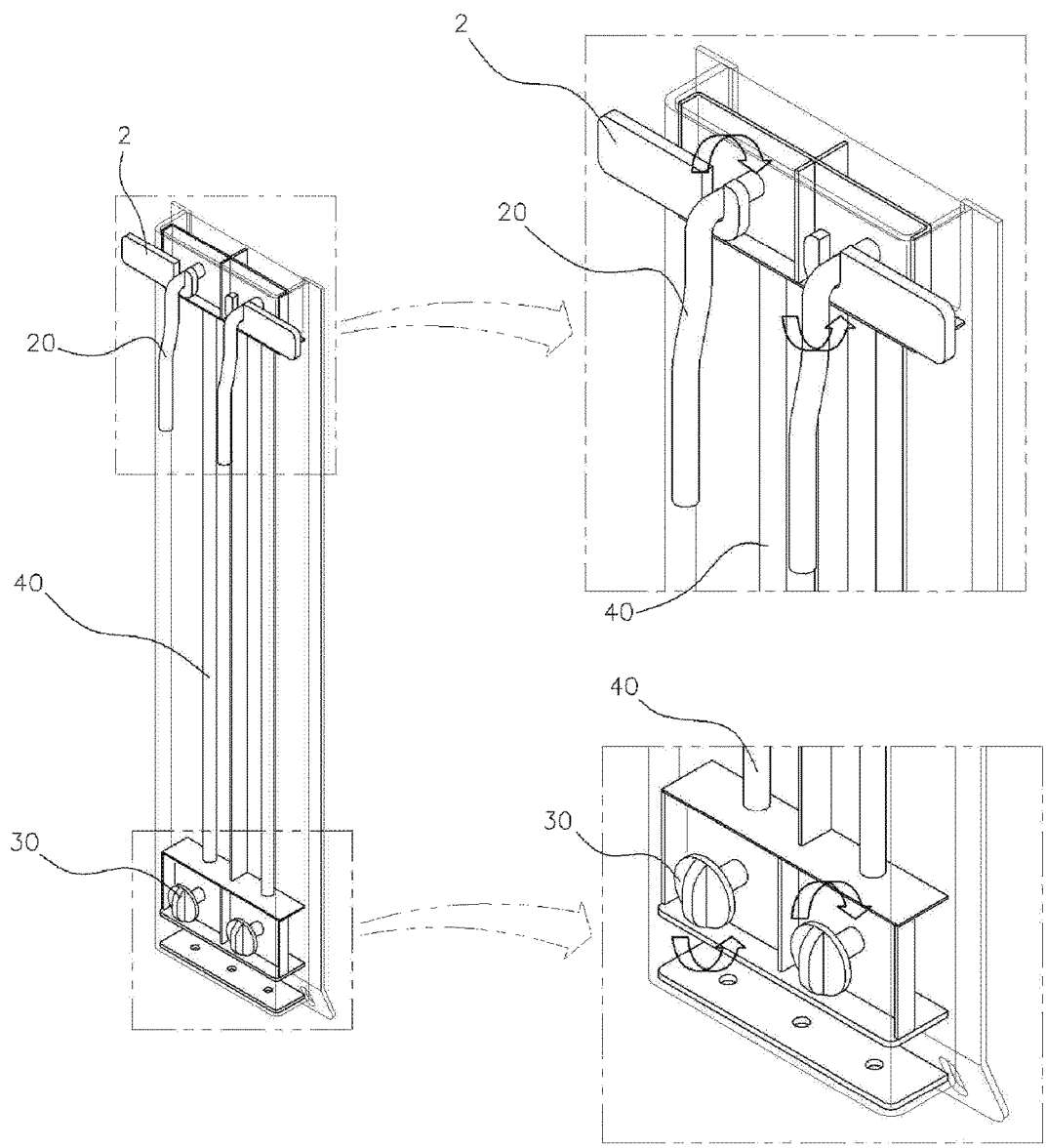
FIG. 3 is a perspective view illustrating the interior of the post of FIG. 2.
Figure 4:
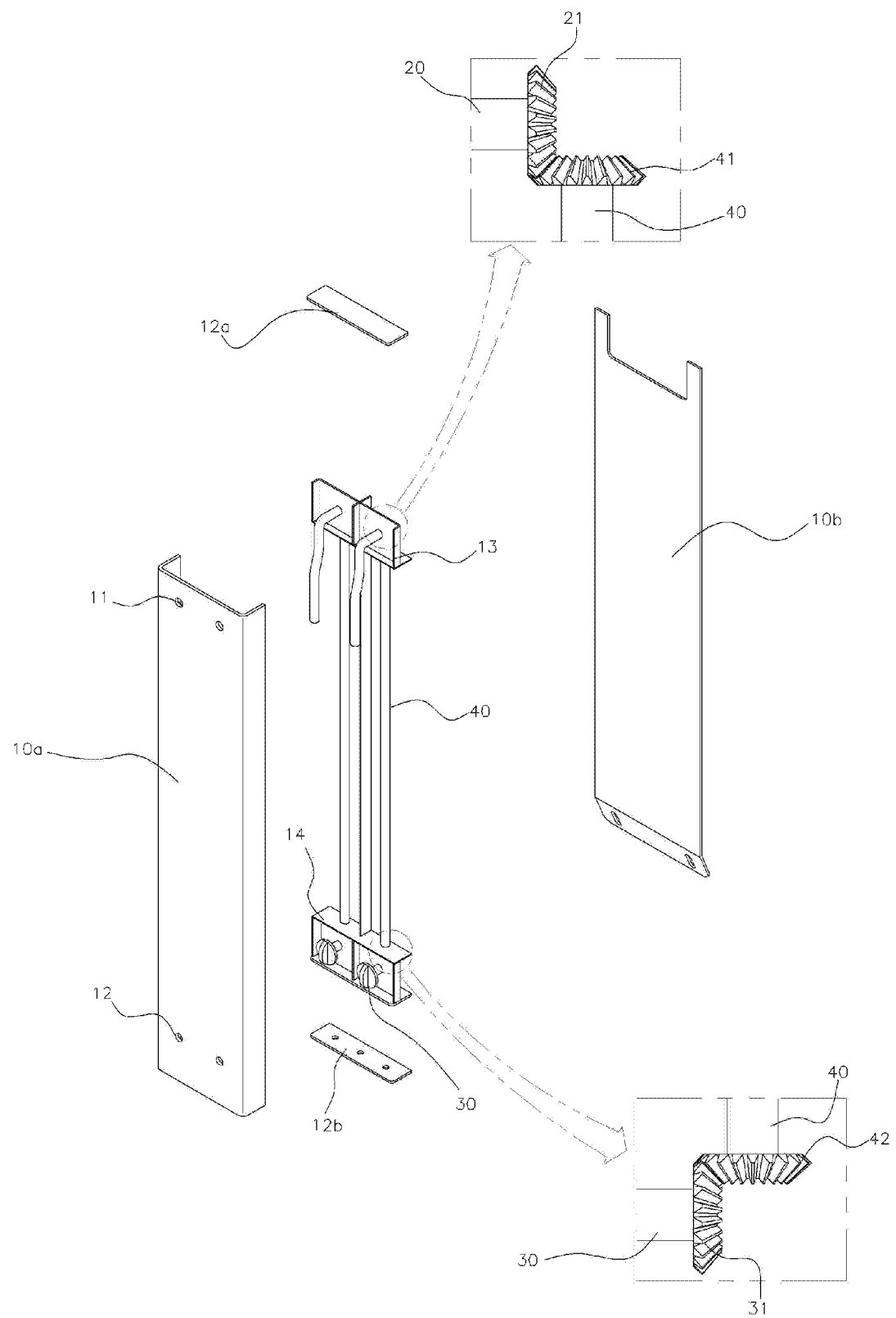
FIG. 4 is a diagram illustrating an aspect in which the post of FIG. 2 is disassembled.

Referring to FIGS. 3 and 4, the knob 30 includes a portion serving as a handle to be configured to rotate by the operator while being held by the hand, and a portion that is fitted to a lower bracket 14 mounted to the inside of the post 10 and is formed with a bevel gear 31 at the tip. Furthermore, the locker 20 of the present invention has a size that allows a worker to rotate while being held by the hand, and has a bent portion which can fix the hook 2 when a terminal end rotates to face downward, and a portion that is fitted to the upper bracket 13 mounted to the inside of the post 10 and is formed with a bevel gear 21 at the tip (for example, formed in a "A" shape).

The locker 20 and the knob 30 rotate in conjunction by being connected to a link bar 40 in which the bevel gears 41 and 42 are coupled to both ends each. The link bar 40 is coupled to the lower bracket 14 and the upper bracket 13 so that meshed state of the bevel gears is maintained.

At the same time, the post 10 is configured by coupling a front plate 10a and a rear plate 10b so that a predetermined space is formed inside, and thus, the locker 20 and the knob 30 are coupled, and the lower bracket 140, the upper bracket 13, and the link bar 40 can be equipped. The front plate 10a is perforated with holes 11 and 12 to make the locker 20 and the knob 30 be fitted, and finishing plates 12a and 12b are mounted to each of the top and the bottom.

Figure 5:
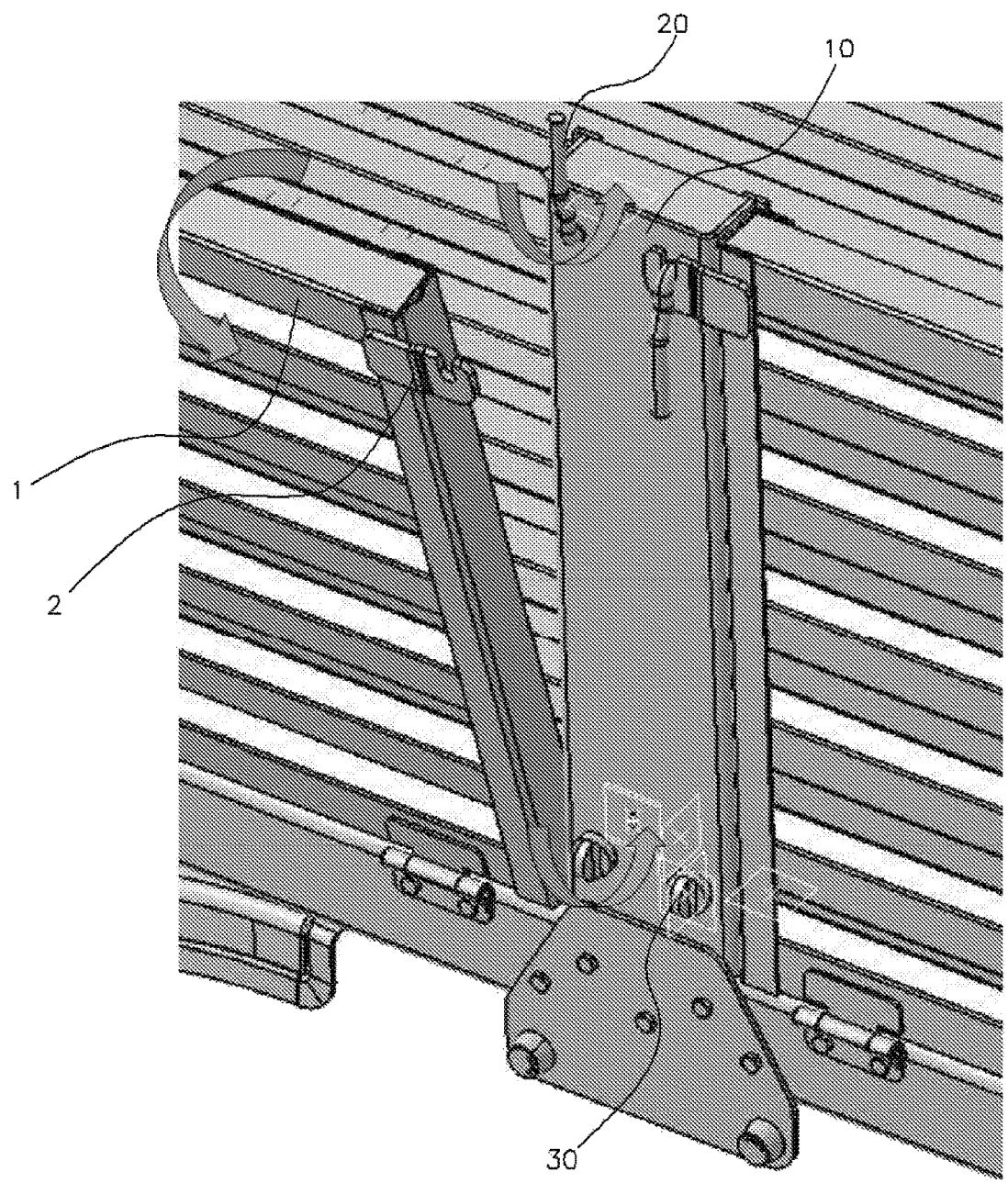
FIG. 5 is a diagram illustrating an aspect in which when the locker rotates in conjunction with the rotation of the knob, the lock is unlocked to allow opening of the side gate.

Thus, as illustrated in FIG. 5, rotational force generated as the worker turns the knob 30 while being held by the hand is transmitted to pivot the locker 20 through the link bar 40.

At this time, the gear ratio between the knob 30 and the link bar 40, and the gear ratio between the locker 20 and the link bar 40 can be set to various levels so that excessive force (to be turned by a worker with hand) is not required depending on the sizes of the locker 20 and/or the knob 30 and specifications of the truck.

In the exemplary embodiment of the present invention, the post 10 is disposed between the two adjacent side-gates 1, and to allow each of both side-gates 1 to be fixed, by forming a set of the locker 20, the knob 30, and the link bar 40, such that two sets are mounted on both sides one by one. However, when the side-gate 1 is located only on one side while being located on the rearmost part or the foremost part, one set can be installed one by one.

For reference, in an exemplary embodiment of the present invention, although the bevel gear is selected as device for transmitting the rotational force, it is also possible to adopt known device such as a worm gear, a chain, a belt, or a multi-joint link as a power transmission device, and it is possible to select and apply an appropriate lubricant to the joint part and the contact portion between the gears.

At the same time, the post 10, the link bar 40, the knob 30, and the locker 20 are made of a metallic material, and are preferably made of SS400 rolled steel material having a minimum tensile strength of 400 N/mm$^2$, and the post 10 is preferably manufactured to have a thickness of 4 to 6 mm.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A locking apparatus of a side-gate in which a locker pivotably mounted to a post is selectively coupled to a hook when the side-gate mounted with the hook is in a state of pivoting upward, the locking apparatus comprising:

the locker configured to be selectively engaged to the hook;

a knob located to be spaced apart from the locker and pivotably mounted to the post; and a link bar, a first end of which is connected to the locker, and a second end of which is connected to the knob, wherein rotational force generated by the knob is transmitted to the locker to pivot the locker through the link bar, wherein the post is vertically disposed with respect to a floor to be aligned with the side-gate when the side-gate is in a state of pivoting upward from the floor, and wherein on one side of the post, the locker is located on a relatively upper side from the floor, and the knob is located on a relatively lower side of the locker from the floor.

2. The locking apparatus of side-gate of claim 1, wherein connection between the knob and the link bar is performed through a first bevel gear set, and connection between the locker and the link bar is performed through a second bevel gear set, and wherein the rocker and the knob rotate in conjunction by being connected to the link bar in which a first bevel gear of the first bevel gear set and a first bevel gear of the second bevel gears are connected to the first and second ends of the link bar.

3. The locking apparatus of the side-gate of claim 2, wherein a gear ratio between the knob and the link bar is set to be different from a gear ratio between the locker and the link bar.

4. The locking apparatus of the side-gate of claim 1, wherein the post is disposed between two adjacent side-gates, and to allow each of the two adjacent side-gates to be fixed, two sets, each set including the locker, the knob, and the link bar, are mounted on both sides of the post one by one.

5. The locking apparatus of side-gate of claim 2, wherein a second bevel gear of the first bevel gear set is connected to the knob and a second bevel gear of the second bevel gears is connected to the locker.

\* \* \* \* \*